United States Patent [19]
Daems et al.

[11] Patent Number: 5,962,181
[45] Date of Patent: Oct. 5, 1999

[54] PROCESS FOR THE PREPARATION OF A METAL HEAT MODE RECORDING ELEMENT

[75] Inventors: Eddie Daems, Herentals; Steven Lezy, Antwerp; Johan Lamotte, Rotselaar; Luc Leenders, Herentals, all of Belgium

[73] Assignee: AGFA-Gevaert, N.V., Mortsel, Belgium

[21] Appl. No.: 08/837,748

[22] Filed: Apr. 22, 1997

Related U.S. Application Data

[60] Provisional application No. 60/020,711, Jun. 27, 1996.

[30] Foreign Application Priority Data

Apr. 23, 1996 [EP] European Pat. Off. ............... 96201082

[51] Int. Cl.$^6$ ........................................................ G03C 8/00
[52] U.S. Cl. .................... 430/201; 430/200; 430/270.11; 430/270.12; 430/945; 156/247; 156/249
[58] Field of Search ...................................... 430/200, 201, 430/270.11, 270.12, 945; 15/247, 249

[56] References Cited

U.S. PATENT DOCUMENTS

| | | | |
|---|---|---|---|
| 3,964,389 | 6/1976 | Peterson | 101/467 |
| 4,157,412 | 6/1979 | Deneau | 428/147 |
| 4,650,742 | 3/1987 | Goto et al. | 430/271 |
| 4,748,150 | 5/1988 | Vanier et al. | 503/227 |
| 5,110,707 | 5/1992 | Fujita et al. | 430/256 |
| 5,147,490 | 9/1992 | Leenders et al. | 156/238 |
| 5,631,117 | 5/1997 | Nakajima et al. | 430/200 |

FOREIGN PATENT DOCUMENTS

| | | | |
|---|---|---|---|
| 384041 | 8/1990 | European Pat. Off. | B32B 31/08 |
| 687569 | 12/1995 | European Pat. Off. | B41M 5/24 |

*Primary Examiner*—Nam Nguyen
*Assistant Examiner*—Steven H. VerSteeg
*Attorney, Agent, or Firm*—Breiner & Breiner

[57] ABSTRACT

A process is disclosed for the preparation of a heat mode recording element comprising (A) laminating a layer pack (1) containing a temporary support, a release layer, a protective layer, an optional intermediate layer, a subbing layer and a thin metal layer, preferably a bismuth layer, to a layer pack (2) comprising a (thermo)adhesive layer and a permanent support, and (B) peeling off the temporary support and the release layer. In an alternative embodiment, when the protective layer contains a radiation-curable composition, the intermediate layer and the subbing layer can be omitted. A heat mode image is obtained by exposing information-wise a thus defined recording element by means of intense laser radiation, preferably produced by an infra-red laser.

6 Claims, 1 Drawing Sheet

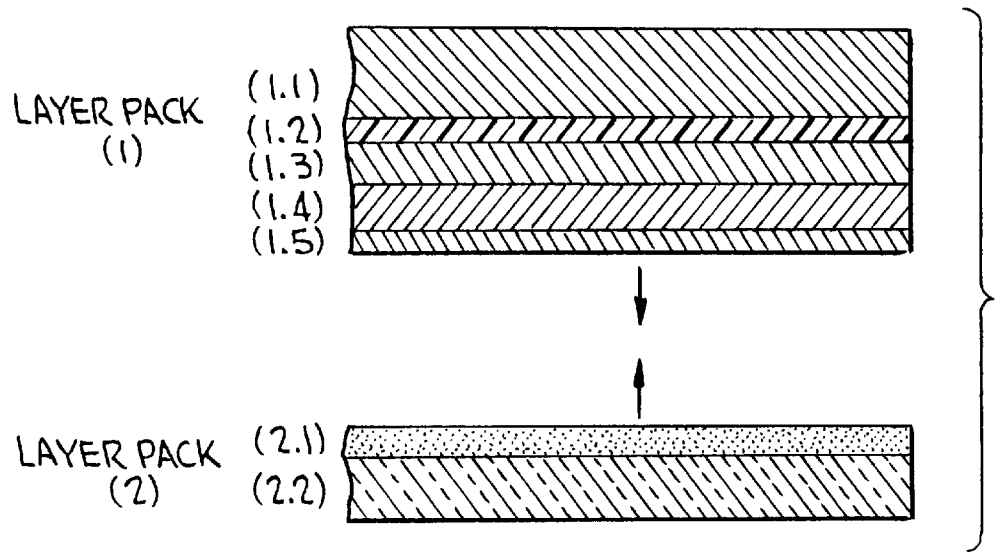
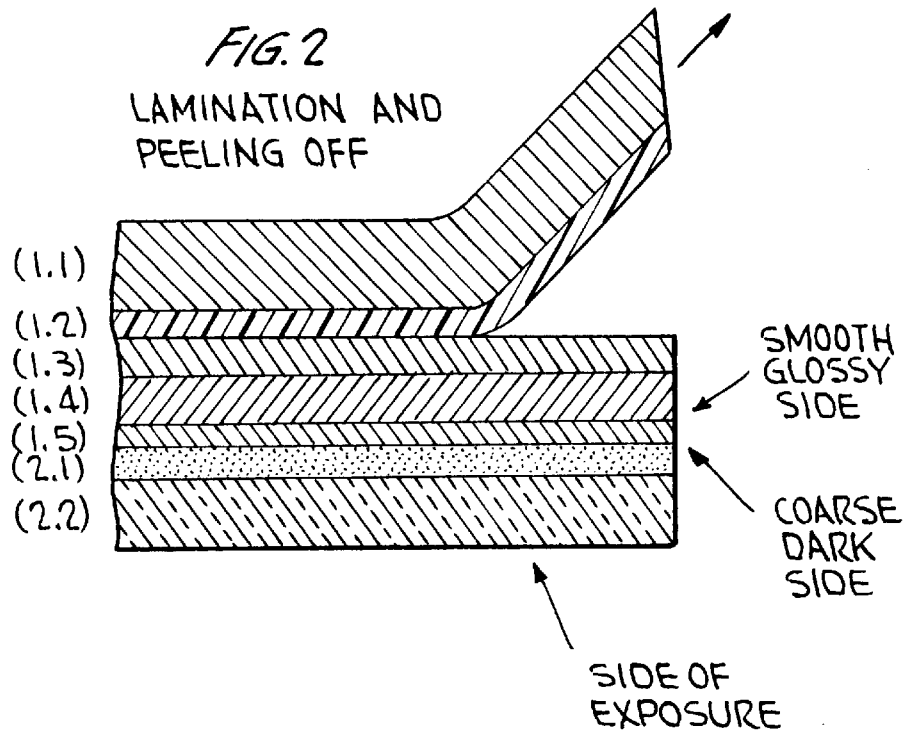

PROCESS FOR THE PREPARATION OF A METAL HEAT MODE RECORDING ELEMENT

This application claim benefit of U.S. Provisional Application No. 60/020,711 Jun. 27, 1996.

DESCRIPTION

1. Field of the Invention

The present invention relates to an improved heat mode recording element containing a thin metal recording layer.

2. Background of the Invention

Recording materials have been disclosed on which records are made thermally by the use of intense radiation like laser beams having a high energy density. In such thermal recording or heat mode recording materials information is recorded by creating differences in reflection and/or in transmission optical density on the recording layer. The recording layer has high optical density and absorbs radiation beams which impinge thereon. The conversion of radiation into heat brings about a local temperature rise, causing a thermal change such as evaporation or ablation to take place in the recording layer. As a result, the irradiated parts of the recording layer are totally or partially removed, and a difference in optical density is formed between the irradiated parts and the unirradiated parts (cf. U.S. Pat. Nos. 4,216,501, 4,233,626, 4,188,214 and 4,291,119 and British Pat. No. 2,026,346)

The recording layer of such heat mode recording materials is usually made of metals, dyes, or polymers. Recording materials like this are described in "Electron, Ion and Laser Beam Technology", by M. L. Levene et al.; The Proceedings of the Eleventh Symposium (1969); "Electronics" (Mar. 18, 1968), P. 50; "The Bell System Technical Journal", by D. Maydan, Vol. 50 (1971), P. 1761; and "Science", by C. O. Carlson, Vol. 154 (1966), P. 1550.

Recording on such thermal recording materials is usually accomplished by converting the information to be recorded into electrical time series signals and scanning the recording material with a laser beam which is modulated in accordance with the signals. This method is advantageous in that recording images can be obtained on real time (i.e. instantaneously). Recording materials of this type are called "direct read after write" (DRAW) materials. DRAW recording materials can be used as a medium for recording an imagewise modulated laser beam to produce a human readable or machine readable record. Human readable records are e.g. micro-images that can be read on enlargement and projection. An example of a machine readable DRAW recording material is the optical disc. To date for the production of optical discs tellurium and its alloys have been used most widely to form highly reflective thin metal films wherein heating with laser beam locally reduces reflectivity by pit formation (ref. e.g. the periodical 'Physik in unserer Zeit', 15. Jahrg. 1984/Nr. 5, 129–130 the article "Optische Datenspeicher" by Jochen Fricke). Tellurium is toxic and has poor archival properties because of its sensitivity to oxygen and humidity. Other metals suited for use in DRAW heat-mode recording are given in U.S. Pat. No. 4,499,178 and U.S. Pat. No. 4,388,400. To avoid the toxicity problem other relatively low melting metals such as bismuth have been introduced in the production of a heat-mode recording layer. By exposing such a recording element very shortly by pulses of a high-power laser the radiation is converted into heat on striking the bismuth layer surface. As a result the writing spot ablates or melts a small amount of the bismuth layer. On melting the layer contracts on the heated spot by surface tension thus forming small cavitations or holes. As a result light can pass through these cavitations and the density is lowered to a certain Dmin value depending on the laser energy irradiated.

According to EP 0 384 041 a process is provided for the production of a heat mode recording material having "direct read after write" (DRAW) possibilities wherein a web support is provided with a heat mode recording thin metal layer, preferably a bismuth layer, characterized in that in the same vacuum environment a protective organic resin layer in web form is laminated to said supported recording layer by means of an adhesive layer.

According to EP 0 678 569 disclosing a further improvement to the teachings of EP 0 384 041 a process is provided for the production of a heat-mode recording material having "direct read after write" (DRAW) capability and containing a heat mode recording metal layer on a permanent support, wherein said process comprises in consecutive order the steps of (1) forming a laminated web by laminating with heat and pressure to said recording layer a single adhesive layer or multiple layer assemblage carried by a web-type temporary support which layer or layer assemblage has a thickness not larger than 20 $\mu$m, and (2) separating said temporary support from said adhesive layer leaving said single adhesive layer as a protective element on said recording layer, or (2') separating said temporary support from said adhesive layer assemblage leaving said layer assemblage as a protective element on said recording layer, and (3) chemically hardening said single adhesive layer or said outermost layer of said multiple layer assemblage after said separating step (2) or (2') by means of heat and/or by ultra-violet radiation or electron beam radiation. In this embodiment the single adhesive layer or the assemblage has to have a minimal thickness of 5 $\mu$m.

In the latter reference the metal layer, preferably a bismuth layer, is applied by evaporation in vacuo to the permanent support, preferably a PET support, before lamination of the adhesive layer(s) +temporary support pack. As a consequence, the interface metal layer/permanent support is smooth and has a glossy appearance; on the contrary the upper side of the metal layer, later on is laminated with the thin adhesive layer pack, is rather coarse and has a darker appearance. With this material design laser recording through either side of the material gives rise to problems. From an energetic point of view recording through the thin layer pack at the dark side of the bismuth layer is most favourable since it is the side of minimal reflection. However inherent thickness variations in the thin adhesive layer pack give rise to strong optical interference patterns. On the other hand, exposing through the permanent support side, being the glossy side, is energetically unfavourable due to the higher reflection.

The present invention constitutes an improvement to the teachings of EP 0 678 569.

It is an object of the present invention to provide a process for the preparation of a heat mode recording element, based on a thin metal layer, having improved sensitivity.

It is a further object of the present invention to provide a process for obtaining a heat mode image by means of laser exposure of such a thin metal layer recording element which is hardly sensitive to the occurence of disturbing interference patterns.

It is still a further object of the present invention to provide a process for obtaining a heat mode image that can be used as a master for the exposure of a printing plate or of a graphic arts contact film based on silver halide chemistry, or as a master for PCB applications.

3. Summary of the Invention

The objects of the present invention are realized by providing a process for the preparation of a heat mode recording element comprising the following steps:

(A) laminating a layer pack (1) comprising the following layers, in order:

(1.1) a temporary support, (1.2) a release layer, (1.3) a protective layer, (1.4) an optional intermediate layer, (1.5) a subbing layer, (1.6) a thin metal layer, to a layer pack (2) comprising following layers:

(2.1) a pressure sensitive adhesive or thermoadhesive layer, (2.2) a permanent transparent support, said thin metal layer (1.6) and said pressure sensitive adhesive or thermoadhesive layer (2.1) facing each other, (B) removing said temporary support (1.1) and said release layer (1.2) by a peeling off process, thus obtaining a heat mode recording element.

A heat mode image can be obtained by exposing information-wise a heat mode recording element as defined above to intense laser radiation, preferably by an infra-red laser.

In this case the heat mode element can be exposed through the permanent support, being the dark bismuth side which is energetically favourable, without the danger for occurence of interference patterns since the thin layer pack susceptible of thickness variations is at the other side. In this way higher sensitivity can be obtained.

In a preferred embodiment the thin metal layer is a bismuth layer.

In an alternative embodiment of the present invention the protective layer is based on a radiation-curable composition as disclosed in EP 0 687 569, cited above, and in this case the optional intermediate layer (1.3) and the subbing layer (1.5) can be omitted.

DETAILED DESCRIPTION OF THE DRAWING

FIG. 1 illustrates schematically the layer pack before lamination.

FIG. 2 illustrates schematically the layer pack during lamination and peeling off.

DETAILED DESCRIPTION

Useful transparent organic resin supports for the permanent support (2.2) and for the temporary support (1.1) include e.g. cellulose nitrate film, cellulose acetate film, polyvinylacetal film, polystyrene film, polyethylene terephthalate film, polycarbonate film, polyvinylchloride film or poly-Alpha-olefin films such as polyethylene or polypropylene film. In a most preferred embodiment of the present invention both the permanent support and the temporary support are polyethylene terephthalate supports with or without a subbing layer. Another suitable support is so-called syndiotactic polystyrene since this resin shows an excellent dimensional stability under varying conditions of temperature and relative humidity. The use of such a support for photographic film has already been disclosed in EP 0 423 712 and EP 0 677 778. This support is also very suitable for the embodiments disclosed in EP 0 384 041 and EP 0 678 569 cited above.

The thickness of the temporary support is preferably comprised between 10 and 200 $\mu$m. The thickness of the permanent support ranges preferably between 75 and 175 $\mu$m.

The release layer can be based on various compositions. When the PET support is subbed, e.g. with a layer containing co(vinylidene chloride-methylacrylate-itaconic acid; 88/10/2) and KIESELSOL 100F, the release layer is preferably based on a combination of colloidal silica such as KIESELSOL 300F and LAPONITE S, e.g. in a ratio 75/25. Alternatively, the release layer can be based on polyvinyl alcohol. Such a polyvinyl alcohol based release layer can be prehardened by crosslinking e.g. with tetramethoxysilane. When on the contrary the polyethylene terephthalate or cellulose triacetate support is unsubbed the release layer can contain co(vinyl acetate-crotonic acid ; 95/5), or it can be a silicone layer, or it can be based on a combination of a polyhydroxystyrene, such as marketed by Maruzen Co, and of a polyamide such as AMILAN CM8000 from Toray Co.. The thickness of the release layer is preferably in the range of 0.3 to 5 $\mu$m.

The composition of the protective layer is in a preferred embodiment based on nitrocellulose. However other possible principal polymeric ingredients include polymethylmethacrylate, e.g. ACRYLOID K12ON (Rohm and Haas Co.) or ELVACITE 2010 (DuPont Co.), polyethylacrylate such as ELVACITE 2043 or 2045 of DuPont, CARBOSET 526 (Goodrich), co(vinylidene chloride-vinyl acetate) such as UCAR VYNS-3 (Union Carbide Co.), or DYNAPOL L912 or L206 (Hüls Troisdorf AG).

On the other hand the protective layer can be based on a radiation-curable composition as described for the adhesive layer or layer assemblage in EP 0 687 569 cited above. As disclosed therein such a radiation-curable composition contains as primary components (1) at least one reactive (pre)polymer or oligomer, (2) optionally at least one reactive solvent monomer dissolving (1), (3) in the case of an UV curable formulation a photoinitiator.

In said composition (1) the reactive (pre)polymer or oligomer is a compound containing one or more ethylenically unsaturated groups. Reactive polymers containing ethylenically unsaturated groups are commercially available from BOMAR Specialities Company under the tradename of JAYLINK (modified cellulose polymers containing acrylamidomethyl groups).

These reactive (pre)polymers or oligomers (1) are present in said composition preferably in a 10 to 100% by weight ratio and said reactive solvent in a 0 to 10% weight ratio.

When present the photoinitiator having UV-absorptivity is used in a concentration as low as possible, e.g. in a concentration of 0.1 to 1% by weight ratio with respect to the total coating composition. Preferably photo-bleachable photoinitiators are used.

Examples of suitable prepolymers for use in a radiation-curable composition of the protective layer applied : unsaturated polyesters, e.g. polyester acrylates; urethane modified unsaturated polyesters, e.g. urethane-polyester acrylates. Liquid polyesters having an acrylic group as a terminal group, e.g. saturated copolyesters which have been provided with acryltype end groups are described in published EP-A 0 207 257 and Radiat. Phys. Chem., Vol. 33, No. 5, 443–450 (1989).

Copolyesters substantially free from low molecular weight, unsaturated monomers and other volatile substances are of very low toxicity (ref. the periodical Adhäsion 1990 Heft 12, page 12). The preparation of a large variety of radiation-curable acrylic polyesters is given in German Offenlegungsschrift No. 2838691. Mixtures of two or more of said prepolymers may be used.

Further polymers suited for use in radiation (ultraviolet or electron-beam) curable compositions are selected from the group consisting of unsaturated urethane(meth)acrylates, epoxy(meth)acrylates, polyether(meth)acrylates and polyester(meth)acrylates as described e.g. in "Chemistry & Technology of UV and EB formulation for coatings, inks and paints" Vol.2 : Prepolymers and Reactive diluents for UV and EB curable formulations." Ed. P.K.T. OLDRING—SITA Technology—London (1991). A survey of UV-curable coating compositions is given e.g. in the periodical "Coating" 9/88, p. 348–353.

Other UV-curable layers can be obtained by the use of prepolymers also called oligomers of the class of aliphatic and aromatic polyester-urethane acrylates. The structure of polyester-urethane acrylates is given in the booklet "Radiation Cured Coatings" by John R. Constanza, A. P. Silveri and Joseph A. Vona, published by Federation of Societies for Coatings Technology, 1315 Walnut St. Philadelphia, Penna. 19107 USA (June 1986) p. 9.

The chemical structure of particularly useful aromatic polyester-urethane acrylate prepolymers is illustrated by following general formula

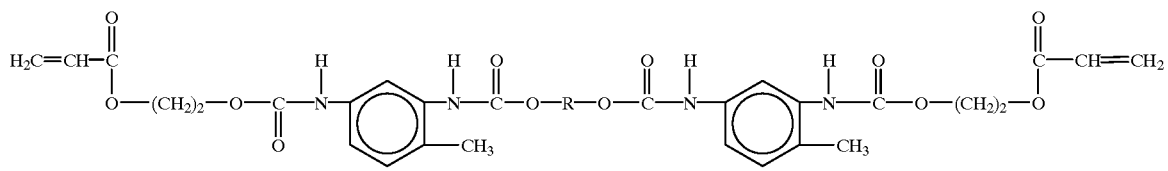

wherein R is a C2 to C6 alkylene group.

Examples of the preparation of aliphatic polyester-urethane acrylates, are given in U.S. Pat. No. 4,983,505 and in DE 2530896.

The introduction of a plurality of acrylic double bonds per polymer chain of the prepolymer proceeds by first effecting a partial esterification of a polyol, e.g. pentaerythritol, with acrylic acid and a subsequent reaction of the still free HO-group(s) of the polyol with a polyfunctional isocyanate.

Suited for use according to the present invention in pressure-sensitive curable layer compositions are ultraviolet cured pressure sensitive adhesives of the class of I. Acrylate Grafted Polyvinyl Alkyl Ethers and II. Monoacrylate Grafted Polyethers are described in Journal of Radiation Curing, Vol. 9/No. 2 April 1982.

The UV or EB curable coating composition may contain inert polymers by which is meant polymers that do not crosslink but improve by their inherent hardness the scratch resistance of the protective layer and counteract sticking to the rearside of the recording material when winding up. For that purpose are mentioned e.g. polyesters derived from aromatic acids, e.g. iso-, or terephthalic acid, poly(meth)acrylate esters of C1–C4 alcohols, e.g. n.-butyl methacrylate, and copolymers thereof with styrene and polyvinyl acetate.

When the adhesion between layers (1.3) and (1.5) is not ideal an intermediate layer can be used. In a preferred embodiment this optional intermediate layer contains a combination of nitrocellulose, gelatin and maleic acid and is coated from a solvent mixture such as methanol/acetone/water. In an alternative but less preferred embodiment the nitrocellulose is omitted from the coating mixture.

The subbing layer which must assure a good adhesion to the thin metal layer that will be applied on it and which influences the distribution and shape of the melted metal droplets in the exposed areas is preferably based on one of the following principal ingredients:

copolyester DYNAPOL L912 (Hüls AG);
co(vinyl acetate-vinyl alcohol-vinyl acetal), e.g. S LEC (Sekisui Co.)
polyamide, e.g. AMILAN CM8000 (Toray Co.);
2-hydroxyethylether, e.g. EHEC extra low or EHEC high (Hercules Co.);
co(styrene-acrylonitrile), e.g. LURAN 388S NATUR (BASF AG);
co(styrene-butadiene), e.g. KRO3 (Phillips Petroleum);
co(styrene-butylmethacrylate), e.g. TONERHARZ VPOT 5603 (Degussa Co.);
NEOCRYL GL30AC (Polyvinyl Chemie);
co(vinyl acetate-crotonic acid), e.g. MOWILITH CT5 (Hoechst);
styrene, e.g. SUPRAPAL LG8404 or LR8404 (BASF AG).

The most preferred embodiment is the incorporation of a high molecular linear copolyester such as the DYNAPOL L912 type.

Possible metals for the recording layers in this invention include Mg, Sc, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Sn, As, Sb, Bi, Se, Te. These metals can be used alone or as a mixture or alloy of at least two metals thereof. Due to their low melting point Mg, Zn, In, Sn, Bi and Te are preferred. The most preferred metal for the practice of this invention is Bi.

The metal recording layer may be applied on top of the subbing layer (1.5) by vapor deposition, sputtering, ion plating, chemical vapor deposition, electrolytic plating, or electroless plating. In the preferred case of Di the recording layer is preferably provided by vapor deposition in vacuo. A method and an apparatus for such a deposition are disclosed in EP 0 384 041 cited above.

The thickness of this Bi layer is preferably comprised between 0.1 and 0.6 μm. When this thickness is too low the recorded images do not have sufficient density. When on the other hand the thickness is too high the sensitivity tends to decrease and the minimal density, i.e. the density after laser recording on the exposed areas tends to be higher.

The composition of the (thermo)adhesive layer of layer pack 2 is based preferably on one of the ingredients listed below:

co(vinyl acetate-ethylene-vinylidene chloride), VINNAPAS E dispersion CEFl9 (Wacker Chemie);
co(acrylate-methylacrylate-styrene), e.g. SYNTHACRYL VSW6899
a polyurethane resin, e.g. PTl9 (Bayer AG);

acrylate copolymer PRIMAL AC 1561 (Rohm and Haas)

methacrylate copolymer, e.g. PLEXTOL M718 or PLEXTOL M600 (Roehm GMBH);

co(ethylacrylate-methylmethacrylate), e.g. PLEXIGUM MB319 (Rohm and Haas Co.);

polyvinyl acetate), e.g. DARATAK 61L (WR Grace & Co.) or GELVA V800 (Monsanto Co.);

co(methylmethacrylate-ethylacrylate-X) CARBOSET 514A (Goodrich Co.);

co(styrene-acrylate) such as UCECRYL 812B (UCB S.A.);

poly(urethane ester), e.g. DISPERCOLL VPKA 8481 (Bayer AG);

co(styrene-butadiene-acrylic acid), such as BAYSTAL P2005 (Bayer);

poly(acrylate), e.g. ACRYSOL WS68 (Rohm & Haas);

co(vinyl acetate-vinyl laurate) such as 25 VL (Wacker Chemie);

co(styrene-butadiene), e.g. PLIOLITE S5B (Goodyear Co.);

co(vinyl acetate-crotonic acid), e.g. MOWILITH CT5 (Hoechst Co);

co(vinyl acetate-vinyl laurate-crotonic acid), VINNAPAS B100 (Wacker Chemie);

a copolyester such as DYNAPOLL L411 or S1420 (Hüls AG).

In a preferred embodiment the adhesive layer contains co(styrene-acrylate), e.g. UCECRYL 812B (UCB).

It will be readily understood that when the adhesive layer (2.1) contains a pressure adhesive which is weak at room temperature layer pack (2) must be provided itself with a temporary cover sheet plus release layer ; otherwise this assemblage could not be rolled up. Right before lamination this temporary cover sheet plus release layer are removed by peeling off. In an alternative way of doing there is no cover sheet present but the backside of the permanent support is provided with a silicone layer. This assemblage can be rolled up and rolled off since the silicone layer acts adhesive to the adhesive layer.

Lamination of layer pack (2) to layer pack (1) may be conducted by putting the two materials in contact and then introducing the materials into the nip of a pair of heated laminating rollers under suitable pressure. Suitable lamination temperatures usually range from approximately 10° C. to 100° C., preferably from 20° C. to 50° C. The lamination step can be performed off-line, but more preferably it is performed on-line, meaning in the vacuum chamber immediately after application of the thin metal layer, preferably bismuth, by evaporation in vacuo. By this way of handling layer pack (1) does not need to be rolled up before it is laminated with layer pack (2) and possible physical damage of the metal layer is avoided.

The peeling off procedure of the temporary support plus release layer can be performed manually or in a delamination apparatus. In its turn the delamination can be performed off-line, but in the preferred case where the lamination is performed on-line the delamination can also be performed on-line still in the vacuum chamber. Finally, the completed heat mode material is rolled up and stored.

When the protective layer is based on a photocurable composition in the sense of EP 0 678 569 and discussed amply above the curing by a radiation procedure can be performed at various stages of the process described:

after coating of the protective layer before lamination of layer pack (2);

after lamination but before delamination;

after delamination of the temporary support plus release layer.

When the protective layer is based on a radiation-curable composition there is a particularly simple alternative embodiment for the process corresponding to the present invention. The layers (1.4) and (1.5) are simply omitted. In this case the process comprises:

(A') laminating a layer pack (1') comprising following layers, in order:
(1'.1') a temporary support,
(1'.2') a release layer,
(1'.3') a radiation-curable protective layer,
(1'.4') a thin metal layer, to a layer pack (2') comprising following layers:
(2'.1') a pressure sensitive adhesive or thermoadhesive layer,
(2'.2') a permanent transparent support, said thin metal layer (1'.4') and said pressure sensitive adhesive (2'.1') or thermoadhesive layer facing each other, (B') removing said temporary support (1'.1') and said release layer (1'.2') by a peeling off process, (C') curing by radiation said protective layer (1'.3') before lamination step (A'), or after lamination but before peeling off step (B'), or after peeling off, thus obtaining a heat mode recording element.

The successful practice of this particular embodiment requires that the protective layer before and after curing shows a good adhesion to the thin metal layer and allows a good distribution of the metal particles after laser recording. In other words, the curable protective layer (1'.3') must combine the required good properties of the protective layer (1.3) and the subbing layer (1.5) of the original embodiment.

After removal of the temporary support plus release layer by delamination the obtained heat mode element is ready for information-wise exposure by laser. It is essential that this exposure is performed through the backside of the transparent permanent support. In a preferred embodiment the intense laser radiation is produced by an infra-red laser. Especially preferred lasers are semiconductor diode lasers or solid state lasers such as a Nd-YAG laser emitting at 1064 nm, or a Nd-YLF laser emitting at 1053 nm.. Other possible infra-red laser types include diode lasers. Important parameters of the laser recording are the spot diameter (D) measured at the $1/e^2$ value of the intensity, the applied laser power on the film (P), the recording speed of the laser beam (v) and the number of dots per inch (dpi).

By the presence of heterogeneous areas in the thermoadhesive layer coated as aqueous polymer latex gas bubbles can occur during laser recording. This renders the layer transparency unacceptable bad. However this can be remedied by fiercefully rubbing or by applying high mechanical pressure after recording.

The following examples illustrate the present invention without however being limited thereto.

EXAMPLES

EXAMPLE 1

Preparation of layer packs 1

On a temporary polyethylene terephthalate support (PET) having a thickness of 100 μm and provided with a subbing layer comprising for 75% of weight co(vinylidene chloride-methylacrylate-itaconic acid 88/10/2) and for 25% of weight colloidal silica KIESELSOL 100F, registered trade mark of Bayer AG, a release layer was applied having a thickness of 0.25 μm and consisting of KIESELSOL 300F, registered trade mark of Bayer AG (75%) and of LAPONITE S, registered trade mark of Laporte Co. (25%).

Onto this release layer the following coating solution was applied so that after drying a 3 μm thick protective layer was obtained:

| nitrocellulose (DS: 2.25)* | 26 g |
|---|---|
| methanol | 335 ml |
| ethanol | 365 ml |
| diethylether | 250 ml |
| n.-propanol | 50 ml |

*degree of substitution

Onto this protective layer the following coating solution was applied so that after drying a 1 μm thick intermediate layer was obtained:

| water | 30 ml |
|---|---|
| gelatin | 12 g |
| maleic acid | 1 g |
| butanol | 200 ml |
| methylethylketone | 370 ml |
| ethanol | 400 ml |
| nitrocellulose (DS: 2.25) | 7.5 g |

A sample of this pack was provided with a subbing layer I.a coated from following composition:

| I.a. | water | 36 ml |
|---|---|---|
| | gelatin | 1.25 g |
| | maleic acid anhydride | 0.125 g |
| | ZELEC NK (DuPont) (fluorosurfactant) | 5 mg |
| | methanol | 5 ml |
| | aceton | 25 ml |
| | formol (40%) | 0.05 ml |
| | water up to | 125 ml |

Four other subbing layer coating compositions (1.b–1.e) were applied to samples of the previous layer pack, wherein however the intermediate layer was omitted. So the subbing layers were directly coated onto the protective layer.

| I.b | toluene | 66 g |
|---|---|---|
| | ethylacetate | 29 g |
| | polystyrene (SUPRAPAL LG8404-BASF) | 5 g |
| I.c | ethanol | 65 g |
| | methanol | 30 g |
| | polyamide (AMILAN CM8000 - Toray) | 5 g |
| I.d | toluene | 66 g |
| | ethylacetate | 29 g |
| | copolyester (DYNAPOL L912 - Hüls) | 5 g |
| I.e | toluene | 66 g |
| | ethylacetate | 29 g |
| | co(vinylacetate-vinylalcohol-vinylacetal) | 5 g |

All these subbing layer compositions were coated to a dry thickness of 1 μm.

Finally, to each of the described layer packs a 300 nm thick bismuth layer was deposited on the subbing layer side by evaporation in vacuo ($10^{-3}$ mbar) in a LEYBOLD-HERAEUS type 1140 apparatus.

preparation of layer pack 2

On a 100 μm thick polyethylene terephthalate support provided with a subbing layer comprising co(vinylidene-methylacrylate-itaconic acid) (88/10/2) (75%) and KIESELSOL 100F (Bayer AG) (25%) following thermoadhesive composition was coated: 18,18 ml of UCECRYL 812B (55%) (UCB S.A.) was diluted with water to 100 ml and coated to a dry thickness of 5 μm.

lamination step

Layer pack 2 was laminated to each sample of layer pack 1 in a CODOR LPP650 laminator (Dorned B.V., The Netherlands) at 65–70 ° C. and a conveying speed of 100 cm/min.

Finally, the temporary support and the release layers of each of layer pack 1 were removed by peeling off.

Laser recording

The obtained heat mode recording materials were imagewise exposed through the permanent support by means of an NdYLF laser having following recording parameters:

pitch : 2117 dpi (full areas), 200 dpi (single scan line);
recording speed 4.4 m/s;
power output on film: 0.52 Watt;
spot diameter ($1/e^2$) 14.9 μm.

The results of the recording are summarized in table 1.

TABLE 1

| Sample No. | Dmax | Dmin | sens.* | quality single scan lines | quality Bi distribution |
|---|---|---|---|---|---|
| I.a | 3.6 | 0.22 | $5.0 \times 10^6$ | slightly frayed | ultra fine |
| I.b | 4.5 | 0.20 | $5.6 \times 10^6$ | slightly frayed | very fine |
| I.c | 4.65 | 0.19 | $4.0 \times 10^6$ | little frayed | fine |
| I.d | 4.6 | 0.19 | $3.6 \times 10^6$ | not frayed | fine |
| I.e | 4.0 | 0.21 | $5.0 \times 10^6$ | very little | very fine |

*sensitivity expressed in $mJ/m^2$; lower figure means higher sensitivity.

In neither of the described cases a disturbing interference pattern occurred.

EXAMPLE 2

In this example the physical characteristics were compared of a heat mode bismuth recording material designed according to the principles of prior art EP 0 687 569 (comparative element I) on the one hand, and a heat mode bismuth recording material designed according to the present invention (invention element II). The principal features of both elements were as follows (table 2a)

TABLE 2a

| element I | element II |
|---|---|
| layer pack 1 | layer pack 1 |
| PET 100 μm | PET 100 μm |
| 75% co(ViCl$_2$MA-IA)*; 88/10/2)/ 25% KIESELSOL 100F (Bayer) thickness 0.1 μm | 75% co(ViCl$_2$MA-IA)*; 88/10/2)/ 25% KIESELSOL 100F (Bayer) thickness 0.1 μm |
| release layer = KIESELSOL 300F/ LAPONITE S (Laporte) (75/25) thickness 0.25 μm | release layer = KIESELSOL 300F/ LAPONITE S (Laporte) (75/25) thickness 0.25 μm |
| protective layer = nitrocellulose thickness 3 μm | protective layer = nitrocellulose thickness 3 μm |
| intermediate layer = nitrocellulose/ gelatin (cf. ex. 1) | intermediate layer = nitrocellulose/ gelatin (cf. ex. 1) |
| adhesive layer = UCECRYL 812B thickness 5 μm | subbing layer = 75% co(ViCl$_2$ MA-IA; 88/10/2)/25% Kieselsol 100F |
| layer pack 2 | Bi layer evaporated onto the |
| Bi layer evaporated onto the subbing layer | subbing layer layer pack 2 |
| subbing layer = 75% co(ViCl$_2$-MA-IA; 88/10/2)/25% KIESELSOL 100F thickness 1 μm | adhesive layer = UCECRYL 812B; 5 μm |
| 75% co(ViCl$_2$-MA-IA; 88/10/2)/ | 75% co(ViCl$_2$-MA-IA; 88/10/2)/ |

TABLE 2a-continued

| element I | element II |
|---|---|
| 25% KIESELSOL 100F<br>thickness 0.1 μm<br>PET 100 μm | 25% KIESELSOL 100F<br>thickness 0.1 μm<br>PET 100 μm |

*co(vinylidenechloride-methylacrylate-itaconic acid)

In table 2b the performance of both elements were compared.

TABLE 2b

| characteristic | element I | element II |
|---|---|---|
| Dmax | 3.5 | 3.8 |
| Dmin | 0.20 | 0.23 |
| sensitivity* | $6.1 \times 10^6$ mJ/m$^2$ | $4.2 \times 10^6$ mJ/m$^2$ |
| compatibility** with AgX recording film | good | very good |
| exposure latitude | <<AgX film | <AgX film |
| thickness protective laminate | 9 μm | 5 μm |
| recording side | glossy side | dark side |

*conditions: spot diameter NdYLF laser $(1/e^2)$ = 15 μm; v = 4.4 m/s
**tested by copying on AgX contact material and on positive and negative working presensitized printing plates From table 2b the advantages of the recording element in accordance with the present invention become clear: still thinner protective laminate on the Bi layer, higher sensitivity. Exposure at the energetically favourable dark bismuth side is possible without the occurence of interference patterns. The compatibility with AgX films is improved. In the case of the comparative element exposure is necessary at the energetically unfavourable smooth bismuth side in order to avoid these interference patterns.

EXAMPLE 3

In the previous examples the lamination of layer pack 1 and 2 to each other occurred in a separate thermal laminator. In this way of doing care has to be taken not to damage the physically vulnerable bismuth layer. This example will demonstrate that the same material characteristics are obtained when the lamination step is performed on-line in the vacuum chamber.

The preparation of sample I.d of example 1 was repeated up to the coating of the subbing layer (layer 1.5). At a distance of about 80 cm from the area of application of the bismuth layer a 1200W infra-red emitting source was mounted in the Heraeus vacuum chamber at a distance of about 3 cm from layer pack 1. About 5 cm farther layer pack 2 was laminated to the preheated layer pack 1 by means of a pair of laminator rollers. The peeling off of the temporary support occurred off-line.

The same characteristics as for sample I.d of example 1 were obtained. However, as a big advantage, perfectly scratch-free and pinhole-free recording materials could be prepared by the on-line method.

EXAMPLE 4

In this example the protective layer (1.3) was a photocurable layer.

The following layer packs were prepared layer pack 1:

temporary support=PET 100 μm having following subbing layers:

a) 75% co(ViCl$_2$-MA-IA; 88/10/2) / 25% KIESELSOL 100F (Bayer);

thickness 0.1 μm, and b) 80% gelatin and 20% Kieselsol 100F;

thickness 0.1 μm;

release layer=polyvinylalcohol (POLYVIOL V03 - Wacker Chemie);

thickness 1 μm, coated from a 5% aqueous solution containing 0.2% of the commercial wetting agent ULTRAVON;

a photo-curable protective layer coated from following composition:

HABI (1,1'-biimidazole-2,2'-bis(o-chlorophenyl)-4,4',5,5'-tetraphenyl) 1.5 g mercaptobenzoxazole 0.08 g Michler's ketone 0.12 g co(styrene-acrylate)=TONERHARZ VPOT5152 (Degussa) 9.8 g dipentaerythritol pentacrylate=SR399 (SARTOMER) 7.2 g methylethylketone 181.3 g This composition was coated with a 40 μm coating knife to a dry thickness of about 3.4 μm. A 300 nm thick bismuth layer was applied by evaporation in vacuo (see ex. 1).

Layer pack 2 was identical to the one from example 1.

The two layer packs were laminated to each other in a CODOR LPP650 laminator at 65° C. with a conveying speed of 100 cm/min. The curing of the protective layer occured by ultra-violet radiation in the following way. In a UV-contact exposure unit CDL1501 (Agfa-Gevaert N.V.) the complete assemblage was exposed uniformly for 30 s at a power output of 2300 μW/cm$^2$ through the temporary support. After this photo-curing the temporary support was peeled off. The laser recording was performed as in example 1. The following results were obtained (table 3):

TABLE 3

| sensitivity | $5.1 \times 10^6$ mJ/m$^2$ |
|---|---|
| Dmin | 0.21 |
| Dmax | 4.32 |
| quality single scan lines | little frayed |
| Bi distribution | fine |
| scratch resistance | very good |

We claim:

1. Process for the preparation of a heat mode recording element comprising the following steps:

(A) laminating a layer pack (1) comprising the following layers, in order:
  (1.1) a temporary support,
  (1.2) a release layer,
  (1.3) a protective layer,
  (1.4) a intermediate layer containing a mixture of nitrocellulose, gelatin and maleic acid,
  (1.5) a subbing layer,
  (1.6) a thin metal layer, to a layer pack (2) comprising following layers:
  (2.1) a pressure sensitive adhesive or thermoadhesive layer,
  (2.2) a permanent transparent support, said thin metal layer (1.6) and said pressure sensitive adhesive or thermoadhesive layer (2.1) facing each other, (B) removing said temporary support (1.1) and said release layer (1.2) by a peeling off process, thus obtaining a heat mode recording element.

2. Process according to claim 1 wherein said protective layer contains nitrocellulose.

3. Process according to claim 1 wherein said protective layer contains a radiation-curable composition and is cured by radiation before lamination step (A), or between lamination step (A) and peeling off step (B), or after peeling off step (B).

4. Process according to claim 1 wherein said curing is performed by ultraviolet radiation, or by electron beam, or by an overall heating step.

5. Process according to claim 1 wherein said thin metal layer is a bismuth layer.

6. Process according to claim 1 wherein said thin metal layer (1.6) is applied on top of said subbing layer (1.5) by evaporation in vacuo.

* * * * *